July 28, 1936.  M. H. STORCH  2,049,029
FRAME ASSEMBLY FOR MIRRORS AND THE LIKE
Filed April 21, 1936
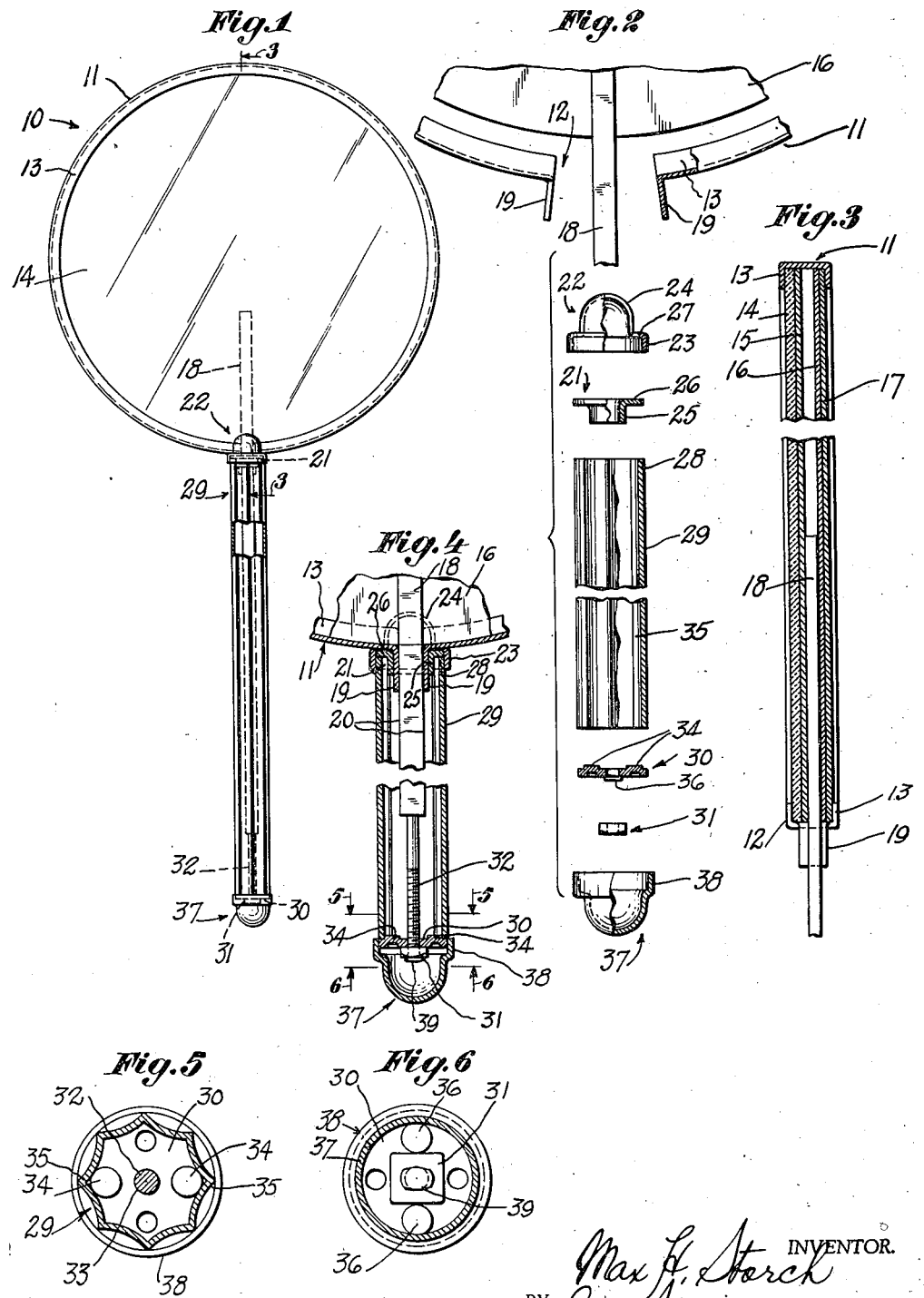
INVENTOR.
Max H. Storch
BY Chris Shumacher
ATTORNEY.

Patented July 28, 1936

2,049,029

UNITED STATES PATENT OFFICE 2,049,029

FRAME ASSEMBLY FOR MIRRORS AND THE LIKE

Max H. Storch, Bell Harbor, N. Y.

Application April 21, 1936, Serial No. 75,657

13 Claims. (Cl. 88—102)

This invention relates to devices such as mirrors, brushes and the like, and has particular reference to frame and handle structures adapted to be quickly and easily assembled.

One object of the invention is to provide a device of the character described whereby a handle is freely rotatably assembled in reenforced relation with a frame structure and is nonrotatably permanently secured in position by screw means according to a novel arrangement whereby a neat and completely finished device is produced by using very simple means and with a minimum of operations.

Another object of the invention is the provision of an improved device of the nature set forth wherein a ferrule or like portion for freely engaging split rim lugs of a frame is held in operative position by a tubular handle sleeved on a mirror back plate rod and is permanently held against removal therefrom by an extremely simple means, and where the lugs are otherwise separate and the frame would become readily disassembled if said handle were removed.

Another object of the invention is to furnish a device of the class alluded to comprising a split rim, a tubular separate handle and means for assembling and securely interengaging the same, operative after assembling of the handle and the rim, whereby a single locking means is adapted to maintain the parts assembled.

Another object of the invention is to provide a device of the nature set forth including a rim and handle constructed of thin sheet metal and interengaged in assembly relation in an improved manner without cutting threads therein, where the rim terminates in easily formed short terminal lugs or prongs, and separate means strongly associated with the rim securely holds the handle in the assembled relation with the rim.

A further object of the invention is to provide an improved device of the nature set forth having few and simple parts, and which is very inexpensive to manufacture and assemble, requires a minimum of material, can be assembled largely by hand, and which is durable, reliable and efficient in use.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a view in front elevation showing a device embodying the invention.

Fig. 2 is a fragmentary vertical view thereof with parts in section and parts in elevation, showing the different parts in separated position but in relation for assembling.

Fig. 3 is a sectional view taken on the broken line 3—3 of Fig. 1.

Fig. 4 is an enlarged longitudinal fragmentary sectional view of the handle and rim assembly.

Figs. 5 and 6 are transverse sectional views taken on the lines 5—5 and 6—6 of Fig. 4.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 10 denotes a device embodying the invention and which may be exemplified in a mirror, brush, or any article that is to be rigidly mounted in a frame.

The device 10 may include a frame that may comprise a rim 11, which may be circular, if desired, and which may be split as at 12. Said rim may be of channel or other shape in cross section for engaging and supporting between the flanges 13 thereof an assembly which may comprise a mirror 14, a sheet of pliable backing material 15 therefor, a rigid backing plate 16, and a finishing back plate 17. The rigid backing or foundation plate 16 may have a rod 18 spot welded or otherwise secured thereto in any suitable manner so as to project radially through the split in the rim as hereinafter described. Since the elements 14, 15, 16 and 17 are all circular and of equal size, they are easily inserted into the rim when the latter is expanded as shown in Fig. 2, and then secured as a unit in the rim upon drawing the latter tight.

The rim 11 may comprise end lugs 19 formed from the back of the channel rim and projecting radially outward as shown. These lugs, like the rim itself, thus consist of a pliable metal, and may be relatively flat and free of threads or other special structural features. Hence these lugs may be struck out in course of making the rim 11.

The rod 18 is adapted to extend radially outward between the lugs which engage snugly against opposite edges 20 of the rod, as shown in Fig. 4. For retaining the lugs in this position to cause the rim to be operatively tensioned or clamped, I preferably utilize a U-shaped structure, which may comprise an inner element 21 and an outer element 22. These elements are preferably separate of each other so as to permit easy stamping out thereof. The element 22 is in the nature of a finishing ferrule having a continuous annular flange or skirt 23 from which extend upward the spaced boss-like portions 24 that receive therebetween the adjacent ends of the rim 11 and conceal the split or opening therebetween. The ferrule element 21 is of angular construction and includes a continuous tubular wall 25 adapted to tightly embrace the lugs 19, with the annular flange 26 resting upon the downward facing lip or seat 27 that is provided along the top of the wall 23.

Between the circular walls or flanges 23, 25, there thus results an annular passage that is adapted to receive an upper edge portion 28 of a longitudinally corrugated or fluted handle forming tube 29. Said upper edge portion also acts as a spacer between the walls 23, 25 assuring complete stability and bears upward against the flange 26 to retain the elements 21, 22 in assembled locking relation with the rim 11.

In order to secure the tube 29 in place, I preferably utilize a means which can be adjustably tightened and which will desirably afford a permanent locking engagement. This is important, since if the handle 29 is removed, the entire assembly of the device 10 may collapse.

Desirably I utilize a member 30 which locks with the handle without requiring any change in the construction thereof, and which may also engage a nut 31 nonrotatably, whereby a conventional small nut may be used and yet easily rotated as will now be described.

To the rod 18, I connect at an end thereof a screw 32 as by spot welding or the like. The member 30 may be in the nature of a disc or washer having a central hole 33 to freely receive the screw. The member 30 is also provided with a pair of lugs or tits disposed along a diameter at each side or face of the member, the lugs at one face being offset 90 degrees from those at the other side, so that these lugs can be readily punched. Thus the lugs or tits 34 at one face engage the tube 29 in a pair of opposed corrugations as at 35, and the lugs or tits 36 engage therebetween the nut 31. In this manner the nut 31 can be tightened by turning the handle 29, and the end of the screw 32 can be mutilated as by suitably cutting off a projecting end thereof, so that removal of the screw cannot be accidentally effected.

In fact, by this construction, the handle 29 is locked against rotation, so that an effect of rigidity in a high degree is produced, and wear and consequent loosening of parts avoided.

The device 10 is completed by a cap 37 having a circular enlarged portion 38 of suitable shape so as to be adapted to be driven on or wedged over the disc member 30 and to afford a neat finish for the device.

It is thus seen that the member 30 serves the dual purpose of anchoring the handle 29 and the nut 31 in fixed relation to each other, and also of serving as a base lock for the end cap 37. The disc member has the requisite strength against radial collapse so that the cap can be powerfully driven thereon.

The nut 31 is thus housed within the end cap and concealed therein. But for this purpose, the nut 31 must be quite small. According to this invention, the nut, as above described need not be tightened as by a pair of pliers, but the handle 29 may be grasped and rotated, to effect a powerful manual tightening to a desired degree.

The handle, which is fluted for decorative purposes, thus serves without any change in construction, as an actuator for the nut 31. This handle may be merely cut from tubular fluted stock and is not subject to any stress which would tend to deform the same. In fact, the primary stress thereon is axial.

The handle 29 thus serves as a column to react between the ferrule elements 21, 22 and the nut 31 to maintain the rim 11 in assembly relation. At one end the handle seats on the flat disc 30, and at the other end it seats on the flange 26. At one end the lugs 34 serve to retain the handle centered, and at the other end the flanges 23, 25 serve the same purpose.

The primary means for anchoring the rim 11 to the handle 29 is the backing plate 16. This plate powerfully reenforces the rim against collapse or distortion, and thus protects the mirror and properly distributes certain of the rim anchoring stresses along the rim. Hence the rim 11 can be made of lighter material than would otherwise be possible, and less rim material is necessary, while the drawing and shaping thereof is simplified, especially as it terminates in the short lugs or prongs 19.

Should the handle 29 be subjected to a lateral strain in any direction, the stress would not be directly communicated to the rim and cause distortion thereof, but would be assumed mainly by the rod 18.

The method of assembling the device 10 will now be briefly described. The disc elements 14, 15, 16 and 17 are inserted into the split rim 11, which is then contracted as by drawing together the lugs 19, so that the latter may receive thereon first the element 22, then the element 21, with the rod 18 projecting therethrough and snugly spacing the lugs 19. The handle 29 is then slipped on the rod and seated between the elements 21, 22. Then the disc member 30 and the nut 31 are applied as shown, and the handle turned to tighten the nut. Then the end of the screw is cut so as to deform the same at the nut as at 39. Thus the handle and rim are both permanently locked in assembly relation. Finally, the end cap 37 is applied to complete the device. The assembling can be accomplished practically entirely manually, riveting, soldering, and the like, being unnecessary. The entire construction, practically, consists of parts adapted to be made by light stamping, special cutting or forming operations for the parts being avoided. The parts operated on in assembling can be easily seen and are readily accessible. Accurate fitting is obtainable without requiring precision in manufacture. The several parts all mutually reenforce each other to assure maintenance of alinement and fit and prevent distortion or collapse although the parts are of very light sheet metal.

I claim:

1. A device including a channel rim of sheet metal, said rim having its ends cut to provide outwardly bent relatively flat tongues integral with the back of the channel, a plate seated in the channel rim and having a rod secured thereto, said rod extending radially outward between the tongues with the latter lying against the sides of the rod, a ring structure of generally U-shape in cross section sleeved over the rod and the tongues to maintain the latter against the rod, a sheet metal handle of a diameter substantially larger than the width of said rod and sleeved thereon, said handle having one end portion received in the channel of said ring structure, and means connecting the handle to the rod to cause the handle to maintain the ring structure in operative relation over the tongues and against an adjacent portion of the rim, said means including a screw portion forming an axial part of said rod, a separate anchor plate having a hole freely receiving said screw portion, said anchor plate having abutment with an adjacent end of the handle, a nut on the screw portion for retaining the anchor plate, said screw portion being upset to prevent loosening of the nut, and a cap press fitted on the anchor plate for concealing the nut.

2. A device including a channel rim of sheet metal, said rim having its ends cut to provide outwardly bent relatively flat tongues integral with the back of the channel, a plate seated in the channel rim and having a rod secured thereto, said rod extending radially outward between the tongues with the latter lying against the sides of the rod, a ring structure of generally U-shape in cross section sleeved over the rod and the tongues to maintain the latter against the rod, a sheet metal handle of a diameter substantially larger than the width of said rod and sleeved thereon, said handle having one end portion received in the channel of said ring structure in axial abutment therewith, and means connecting the handle to the rod to cause the handle to maintain the ring structure in operative relation over the tongues and against an adjacent portion of the rim, said connecting means including an anchor plate secured to said rod and lying in axial abutment against the opposite end of the handle, said rod being upset to prevent removal of the anchor plate, said anchor plate having a smooth periphery, and a cap having its rim press fitted on the said periphery.

3. A device including means for holding an article, a handle structure for said means comprising a rod nonrotatably connected to the holding means, a handle member sleeved over the rod, one end of the handle member abutting the holding means, and locking means to secure the handle member upon the rod, the locking means including an anchor plate sleeved on the rod and abutting the other end of the handle member to clamp the handle member in position, the rod having a screw portion, a retaining nut for the anchor plate threadedly engaged with the screw portion of the rod, the handle member having longitudinal recesses, the anchor plate having portions axially nonrotatably fitted in said recesses, said anchor member having means axially nonrotatably engaging the nut, the screw portion being deformed to prevent removal of the nut, and an end cap press fitted on the anchor plate to enclose the nut.

4. A device including a split rim having free ended tongues at the split, said tongues having relatively smooth outside and inside wall surfaces, a plate fitted in the rim and having a rod connected thereto so as to project radially outward at the split, the tongues lying at opposite sides of the projecting portion of the rod, means sleeved over the rod and including a handle portion and a ring portion freely sleeved over the tongues to hold them against the rod, said tongues terminating substantially at the ring portion, said ring portion being movable by the handle into abutting relation with the adjacent portion of the rim, a retaining member sleeved on the rod and engaging the free end of the handle, and an element threadedly connected to the rod at the end thereof and engaging the retaining member to press the same against the handle portion, whereby the latter is caused to move along the rod to cause the rim to be clamped between the plate and the ring portion.

5. A device including a channel rim of sheet material, said rim having its ends cut to provide outwardly bent tongues integral with the back of the channel, a plate seated in the channel rim and having a rod connected thereto and projected radially therefrom with the tongues lying against opposite edges of the projecting portion of the rod, a ring member sleeved over the tongues to retain the same against said rod and being otherwise free of the tongues and rod, said ring member having a lateral flange, a tubular sheet metal handle sleeved over the rod and the ring member and abutting the lateral flange to retain the ring member in position, a retaining member sleeved on said rod and engaging the free end of the handle, and means on said rod engaging the retaining member and pressing the same against the handle, whereby said rod maintains said handle in the operative relation to the ring member.

6. A device including a channel rim of sheet metal, said rim having its ends cut to provide outwardly bent relatively flat short free ended tongues integral with the back of the channel, a plate seated in the channel rim and having a rod secured thereto, said rod extending radially outward between the tongues with the latter lying against the sides of the projecting portion of the rod, a sheet metal ring of angular cross section sleeved over the tongues to retain them against the rod, a separate sheet metal tubular handle axially sleeved over the rod, said handle having one end thereof in abutting relation with one portion of the angular ring, said handle having sleeved alining relation with another portion of the angular ring, a retaining member sleeved on said rod and engaging the free end of the handle, and means on said rod engaging the retaining member and pressing the same against the handle.

7. A device including a channel rim of sheet metal, said rim having its ends cut to provide outwardly bent relatively flat tongues integral with the back of the channel, a plate seated in the channel rim and having a rod secured thereto, said rod projecting radially outward between the tongues with the latter lying against the sides of the projecting portion of the rod, separate inner and outer rings of generally angular cross section, the inner ring being sleeved over the tongues with its axial flange retaining the tongues against the rod, the outer ring being sleeved over the inner ring, the axial flange of the outer sleeve being radially spaced from the corresponding flange of the inner sleeve, said rings having their end flanges lying axially against each other and the end flange of the outer ring lying against the rim, a tubular handle separate from the rings and sleeved over said rod, said handle having one end portion seated between the radially spaced flanges of the rings and in axial abutment with the end flange of the inner ring, a retaining member sleeved on said rod and engaging the free end of the handle, and means on said rod engaging the retaining member and pressing the same against the handle to maintain the latter in abutting relation with said rings.

8. A device including a channel rim of sheet metal, said rim having its ends cut to provide outwardly bent relatively flat tongues integral with the back of the channel, a plate seated in the channel rim and having a rod secured thereto, said rod projecting radially outward between the tongues with the latter lying against the sides of the projecting portion of the rod, a ring structure of generally U-shape in cross section sleeved over the rod and the tongues to maintain the latter against the rod, a sheet metal handle of a diameter substantially larger than the width of the said rod and sleeved thereon, said handle having one end portion received in the channel of said ring structure, a retaining member sleeved on said rod and engaging the free end of the handle, and means on said rod engaging the retaining member and pressing the same against the handle with the latter maintained in engagement in said channel in abutting relation with the ring structure.

9. A device including a split rim, a reenforcing plate fitted in the rim and having a rod connected thereto and extending radially outward at the split, means sleeved on the rod and movable therealong toward the rim into connection with the end portions of the rim, said means having abutment with the rim adjacent to the end portions thereof, and a tubular handle sleeved on the rod and having abutment with said means to cause the abutment of the latter with the rim, said rod having an axial screw portion, an anchor plate sleeved over the screw portion and having abutment with the end of the handle remote from the rim, a nut on the screw portion to retain the anchor plate, the screw portion being upset to prevent removal of the nut, and an end cap press fitted on the anchor plate and enclosing the nut.

10. A device including a rim means for holding an article, means for supporting the same and comprising a handle structure including a rod nonrotatably connected to the rim means, a tubular handle member sleeved over the rod, said rod having an axial screw portion, an anchor plate sleeved freely over the screw portion and having abutment with the end of the handle member remote from the rim means, a nut on the screw portion to retain the anchor plate, the screw portion being upset to prevent removal of the nut, and an end cap press fitted on the anchor plate and enclosing the nut, said handle member being longitudinally corrugated, the anchor plate having a plurality of projections on one face to extend into registering corrugations to prevent relative rotation between the handle member and anchor plate, the latter having projecting means on the opposite face for non-rotatably engaging the nut.

11. A device including a split rim, a reenforcing plate fitted in the rim and having a rod secured thereto and projecting radially outward at the split, said rim having end tongues lying flatwise against opposite sides of the projecting portion of the rod, means sleeved over the rod and including a handle portion and a ring portion freely sleeved over the tongues to secure them against the rod, said tongues terminating substantially at the ring portion, said ring portion being movable by the handle portion into abutting relation with the adjacent portion of the rim, and an anchor portion threadedly secured to the rod and axially engaging the end of the handle portion remote from the ring portion to press the handle toward the rim.

12. A device including means for holding an article, a handle structure for said means including a rod non-rotatably connected to the holding means, a handle sleeved over the rod, one end of the handle member abutting the holding means, and locking means to secure the handle upon the rod, the locking means including an anchor plate sleeved on the rod and abutting the other end of the handle to clamp the same in position, an element threaded on the rod to retain the anchor plate, the latter and the element having non-rotatably axially interengaging means, the anchor plate and the handle having non-rotatably axially interengaging means, and said rod being upset to prevent removal of the element.

13. A device including means for holding an article, a handle structure for said means comprising a rod non-rotatably connected to the holding means, a handle sleeved over the rod, one end of the handle abutting the holding means, and locking means to secure the handle upon the rod, the locking means including an anchor plate sleeved on the rod and lying in abutment with the end of the handle remote from the rim said rod having a threaded end portion, a nut-like element having a threaded hole extending therethrough for engagement with said threaded end portion of the rod for operatively securing said anchor plate, said handle having recesses at an end thereof, said anchor plate having irregularities for non-rotatably axially engaging in the recesses of the handle, said anchor plate having other irregularities for non-rotatably axially engaging said element, said threaded portion being deformed to prevent loosening of said element, whereby the handle is secured against rotary movement.

MAX H. STORCH.